US011800235B2

(12) United States Patent
Geiss et al.

(10) Patent No.: US 11,800,235 B2
(45) Date of Patent: Oct. 24, 2023

(54) DUAL EXPOSURE CONTROL IN A CAMERA SYSTEM

(71) Applicant: GOOGLE LLC, Mountain View, CA (US)

(72) Inventors: Ryan Geiss, Mountain View, CA (US); Marc S. Levoy, Mountain View, CA (US); Samuel William Hasinoff, Mountain View, CA (US); Tianfan Xue, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/629,992

(22) PCT Filed: Aug. 19, 2019

(86) PCT No.: PCT/US2019/047061
§ 371 (c)(1),
(2) Date: Jan. 25, 2022

(87) PCT Pub. No.: WO2021/034311
PCT Pub. Date: Feb. 25, 2021

(65) Prior Publication Data
US 2022/0256068 A1 Aug. 11, 2022

(51) Int. Cl.
*H04N 23/73* (2023.01)
*G06F 3/04847* (2022.01)

(52) U.S. Cl.
CPC ......... *H04N 23/73* (2023.01); *G06F 3/04847* (2013.01)

(58) Field of Classification Search
CPC ...... H04N 23/73; H04N 23/632; H04N 23/71; H04N 23/741; H04N 23/631; G06F 3/04847
See application file for complete search history.

(56) References Cited

U.S. PATENT DOCUMENTS

2016/0173751 A1 6/2016 Nakata
2020/0169657 A1* 5/2020 Ding .................... H04N 23/632

FOREIGN PATENT DOCUMENTS

JP 2013 251724 12/2013
JP 2013251724 A * 12/2013

OTHER PUBLICATIONS

The International Search Report (ISR) with Written Opinion for PCT/US2019/047061 dated May 25, 2020, pp. 1-37.

* cited by examiner

*Primary Examiner* — Ahmed A Berhan
(74) *Attorney, Agent, or Firm* — McDonnell Boehnen Hulbert & Berghoff LLP (57) ABSTRACT

Apparatus and methods related to applying lighting models to images of objects are provided. A neural network can be trained to apply a lighting model to an input image. The training of the neural network can utilize confidence learning that is based on light predictions and prediction confidence values associated with lighting of the input image. A computing device can receive an input image of an object and data about a particular lighting model to be applied to the input image. The computing device can determine an output image of the object by using the trained neural network to apply the particular lighting model to the input image of the object.

25 Claims, 7 Drawing Sheets

DUAL EXPOSURE CONTROL IN A CAMERA SYSTEM

BACKGROUND

Many modern computing devices, including mobile phones, personal computers, and tablets, include image capture devices, such as still and/or video cameras. The image capture devices can capture images, such as images that include people, animals, landscapes, and/or objects.

Some image capture devices and/or computing devices include a graphic display that functions as a viewfinder for the camera (e.g., a phone screen or electronic viewfinder (EVF) on a standalone mirrorless or point and shoot camera). Such camera devices will typically display a preview of the image that will be captured if/when the user clicks (or taps on) the shutter button. This preview is typically a video or image stream that is generated in real-time based on what is being sensed by the camera's image sensor, and may also be referred to as a live-view preview image.

SUMMARY

In one aspect, a computer-implemented method is provided. The method includes: (i) displaying, on a display device, a graphic interface for image capture, the graphic interface comprising: (a) a live-view preview image based on an image data stream from an image sensor of an image-capture device, and (b) a first control feature and a second control feature; (ii) receiving, via the graphic interface, first input data corresponding to a first interaction with the first control feature, and responsively adjusting a first exposure setting based on the first interaction; (iii) applying the first exposure setting in real-time to at least one highlight area in the live-view preview image; (iv) receiving, via the graphic interface, second input data corresponding to a second interaction with the second control feature, and responsively adjusting a second exposure setting based on the second interaction; (v) applying the first exposure setting in real-time to at least one highlight area in the live-view preview image; and (vi) subsequently receiving third input data corresponding to an image-capture command, and responsively operating the image-capture device to capture an image in accordance with both the first exposure setting and the second exposure setting.

In another aspect, a computing device is provided. The computing device includes one or more processors and one or more computer readable media. The one or more computer readable media has stored thereon computer-executable instructions that, when executed by the one or more processors, cause the computing device to carry out functions. The functions include: (i) displaying, on a display device, a graphic interface for image capture, the graphic interface comprising: (a) a live-view preview image based on an image data stream from an image sensor of an image-capture device, and (b) a first control feature and a second control feature; (ii) receiving, via the graphic interface, first input data corresponding to a first interaction with the first control feature, and responsively adjusting a first exposure setting based on the first interaction; (iii) applying the first exposure setting in real-time to at least one highlight area in the live-view preview image; (iv) receiving, via the graphic interface, second input data corresponding to a second interaction with the second control feature, and responsively adjusting a second exposure setting based on the second interaction; (v) applying the first exposure setting in real-time to at least one highlight area in the live-view preview image; and (vi) subsequently receiving third input data corresponding to an image-capture command, and responsively operating the image-capture device to capture an image in accordance with both the first exposure setting and the second exposure setting.

In another aspect, an article of manufacture is provided. The article of manufacture includes one or more computer readable media having computer-readable instructions stored thereon that, when executed by one or more processors of a computing device, cause the computing device to carry out functions. The functions include: (i) displaying, on a display device, a graphic interface for image capture, the graphic interface comprising: (a) a live-view preview image based on an image data stream from an image sensor of an image-capture device, and (b) a first control feature and a second control feature; (ii) receiving, via the graphic interface, first input data corresponding to a first interaction with the first control feature, and responsively adjusting a first exposure setting based on the first interaction; (iii) applying the first exposure setting in real-time to at least one highlight area in the live-view preview image; (iv) receiving, via the graphic interface, second input data corresponding to a second interaction with the second control feature, and responsively adjusting a second exposure setting based on the second interaction; (v) applying the first exposure setting in real-time to at least one highlight area in the live-view preview image; and (vi) subsequently receiving third input data corresponding to an image-capture command, and responsively operating the image-capture device to capture an image in accordance with both the first exposure setting and the second exposure setting.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

This application describes methods and systems that help to provide for control of a camera via an image-capture interface. In particular, methods and systems can provide for pre-image-capture control of highlight and shadow levels, independently from one another, via a live-view preview image.

Some camera applications, such as those on mobile devices, allow the user to adjust the global exposure used by the camera to capture an image, before the image is captured. Such global changes to the exposure may be reflected in a live-view image, which is displayed to preview the image that will be captured if the user presses the shutter button or otherwise initiates the image capture process. However, there are many cases where a global adjustment to exposure is not sufficient, and the user may desire more localized, more scene-specific, and/or more artistic control.

Accordingly, illustrative graphic interfaces provide for real-time control of both shadows and highlights, independently from one another, in a live-view camera interface, before an image is captured. In certain implementations, the adjustments to the shadows and highlights made via the live-view interface may be implemented by adjusting a highlight total exposure time (TET) and a shadow TET, respectively, which can affect different areas of the live-view preview image, and are used for image capture and/or image processing.

Herein, a "total exposure time" or "TET" may be the product of an exposure time (in some standard units; e.g., milliseconds) and a gain multiplier. The exposure time may be set as part of an autoexposure process for a camera device. Further, multiple TETs may be used to generate an output image or video, with different and/or additional gain multipliers applied. For instance, in illustrative embodiments, a "highlight" or "short" TET may be the product of the exposure time and a first gain multiplier, while a "shadow" or "long" TET may be the product of the exposure time and a second gain multiplier (greater than the first gain multiplier). In some cases the "long" TET may be achieved by applying additional digital gain to the short TET, such that long and short TET are provided even when image capture uses only a single analog exposure time.

In some embodiments, a live-view camera interface may include a single slider feature that allows for separate real-time adjustments to both shadow and highlight levels in the live-view preview image stream (such that the preview image has the same shadow and highlight levels as an image that is subsequently captured via a shutter button on the live-view interface). In other embodiments, a live-view camera interface may include two slider features that allow for separate real-time adjustments to both shadow and highlight levels in the live-view preview image stream. Other types of interface features may also provide for separate real-time adjustments to shadow and highlight exposure levels, without departing from the scope of the invention.

Herein a "live-view preview image" should be understood to be an image or sequence of images (e.g., video) that is generated and displayed based on an image data stream from an image sensor of an image-capture device. For instance, image data may be generated by a camera's image sensor (or a portion, subset, or sampling of the pixels on the image sensor). This image data is representative of the field-of-view (FOV) of the camera, and thus indicative of the image that will be captured if the user presses the camera's shutter button or initiates image capture in some other manner. To help a user to decide how to position a camera for image capture, a camera device or other computing device may generate and display a live-view preview image based on the image data stream from the image sensor. The live-view preview image can be a real-time image feed (e.g., video), such that the user is informed of the camera's FOV in real-time.

According to illustrative methods and systems, a computing device may process the image data stream from the sensor in order to generate a live-view preview image that more accurately represents the image or video that will actually be captured if/when the user initiates image capture. Further, the computing device may provide an image-capture interface that includes control features for image processing, in conjunction with a live-view preview image. This arrangement can provide for adjustment of certain image settings or properties before an image is captured, which previously were only adjustable after image capture (e.g., via post-processing in an image editing application).

Herein, the "shadows" or "shadow areas" of an image (or sequence of images) should be understood to include pixels or areas in an image (or across a sequence of images) that are the darkest. In practice, a pixel or area(s) in the image frame having a brightness level below a predetermined threshold may be identified as a shadow area. Of course, other methods for detecting a darker area that qualifies as a shadow area are also possible.

Herein, the "highlights" or "highlights areas" of an image (or sequence of images) can include pixels or area(s) in an image (or across a sequence of images) that are the brightest. In practice, a pixel or area in the image frame having a brightness level above a predetermined threshold may be identified as a highlight area. Note that different thresholds may be utilized to classify shadow and highlight areas (such that areas can exist that are not classified as a shadow or highlight). Alternatively, the threshold for highlights and shadows may be the same (such that every area in the image is classified as a shadow or highlight). Further, the shadow and/or highlight threshold(s) might also be adaptive, and vary based on, e.g., the characteristics of the scene being captured. In some cases, the shadow and/or highlight threshold(s) could vary spatially across the image frame. Other methods for detecting a bright area that qualifies as a highlight area are also possible.

Embodiments described herein may allow for pre-image capture adjustment of shadow and highlight levels, separately from one another. Further, these adjustments may be applied in real-time to a live-view preview, such that the live-view preview provides a more accurate representation of the image or video that will be captured if the user presses the shutter button or initiates video capture. Furthermore, adjusting a short TET and long TET (for shadow and highlight levels, respectively) before image capture can yield superior results, as compared to making such adjustments in post-processing after an image is captured. In particular, example embodiments may adjust a capture TET (e.g., by adjusting shutter speed, aperture, and/or image sensitivity) in order to adjust the short TET and long TET, before image capture. Since making adjustments to exposure time and analog gain (e.g., shutter speed, aperture, and/or image sensitivity) before image capture typically yields better image quality (e.g., less noise, fewer quantization artifacts, less clipping) than using digital gain in post-processing to make corresponding adjustments, cameras utilizing the methods and systems described herein may provide better image quality than they otherwise would.

I. Methods for Providing an Image-Capture Interface

Figure 1:
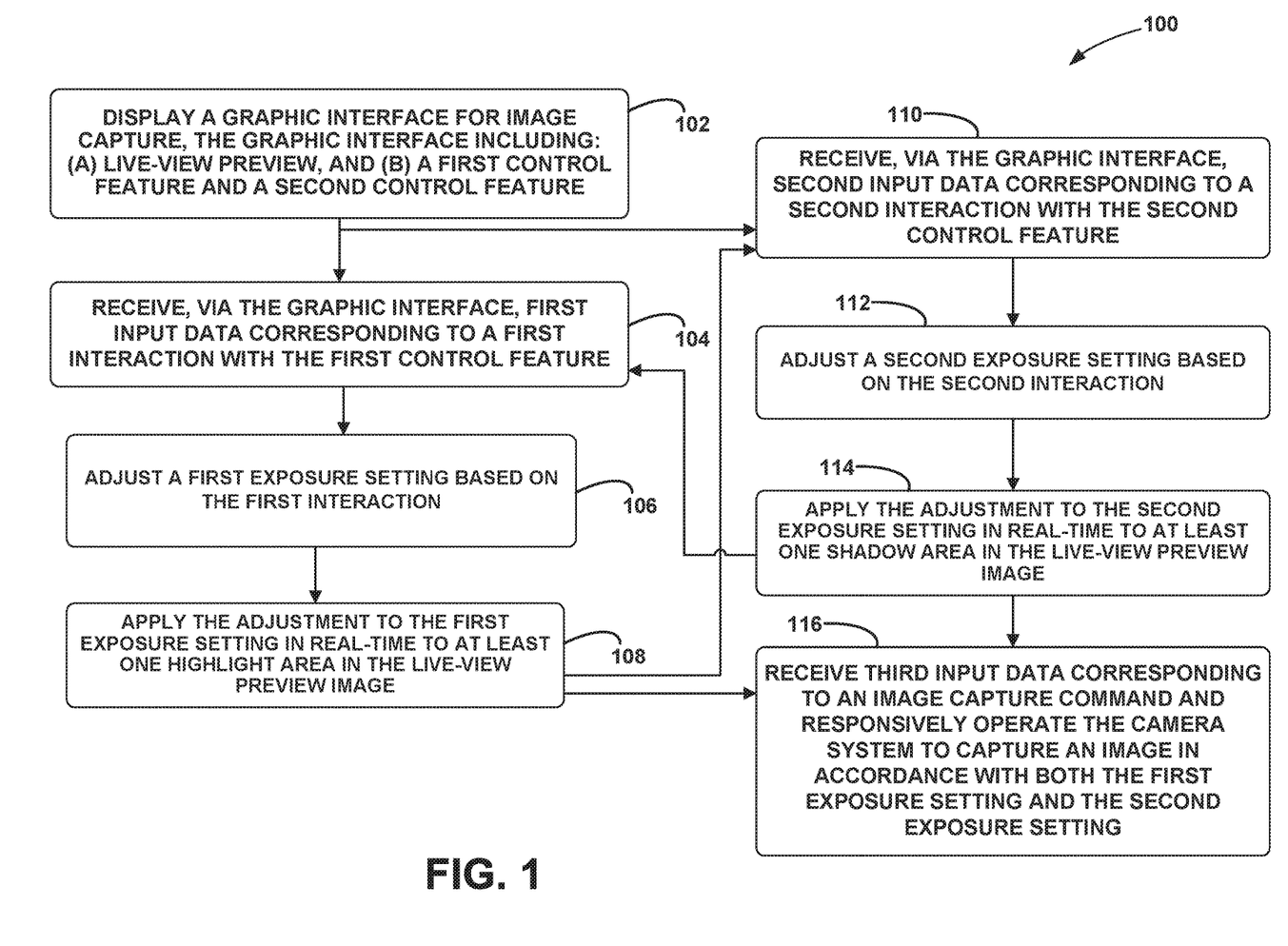
FIG. 1 illustrates a computer-implemented method for providing an image-capture interface.

FIG. 1 is a computer-implemented method 100 for providing an image-capture interface, according to example embodiments. The method may be implemented by an image-capture device, such as a digital camera or mobile phone having one or more camera systems, among other possibilities. The method 100 could also be implemented by a computing device that is in communication with an image-capture device, such as a by a mobile phone or other display device that is being used to control a stand-alone camera device (e.g., a DSLR camera or action camera).

At block 102, method 100 involves displaying a graphic interface for image capture, which includes (a) a live-view preview image, and (b) a first control feature and a second control feature. At block 104, the computing device receives, via the graphic interface, first input data corresponding to a first interaction with the first control feature. In response, the computing device adjusts a first exposure setting based on the first interaction, as shown by block 106. The first control feature can provide for control of exposure in highlight areas of the camera's image frame. Accordingly, the computing device also applies the adjustment to the first exposure setting in real-time to at least one highlight area in the live-view preview image, as shown by block 108.

Continuing with method 100, the computing device receives, via the graphic interface, second input data corresponding to a second interaction with the second control feature, as shown by block 110. In response, the computing device adjusts the second exposure setting based on the second interaction, as shown by block 112. The second control feature can provide for control of exposure in shadow areas of the camera's image frame. Accordingly, the computing device also applies the second exposure setting in real-time to at least one shadow area in the live-view preview image, as shown by block 114.

Subsequently, the computing device receives third input data corresponding to an image-capture command, and responsively operates the image-capture device to capture an image using both the first exposure setting and the second exposure setting, as shown by block 116. Note that either one of or both the first and second exposure settings can be adjusted multiple times (e.g., at blocks 106 and 108, and blocks 110 and 112, respectively) before image capture at block 116.

In some implementations of method 100, the first control feature and the second control feature can be part of a single exposure-control feature in an image-capture interface. For example, the first control feature and the second control feature may be graphic elements (e.g., a circle or another shape) that are movable along the same slider feature. A specific example of this arrangement is subsequently described herein in reference to FIGS. 2A to 2C. In other cases, the first control feature and the second control feature can be separate exposure-control features in an image-capture interface. A specific example of this arrangement is subsequently described herein in reference to FIGS. 3A to 3C. Implementations of method 100 that other arrangements of the first control feature and the second control feature are also possible.

In some embodiments, a camera device or a control device communicatively coupled thereto may include physical controls that are mapped to control the first control feature and the second control feature (or perhaps control the first exposure setting and the second exposure setting directly, without any feedback from a graphic interface). For example, a DSLR or another type of camera could include a live-view interface, as well mechanical control features, such as control knob(s), joystick(s), button(s) and/or slider(s). These mechanical control features could allow for control of the first exposure setting and the second exposure setting in real-time, such that changes to these settings are represented accurately in the live-view interface.

II. Illustrative Graphic Interfaces

Figure 2A:
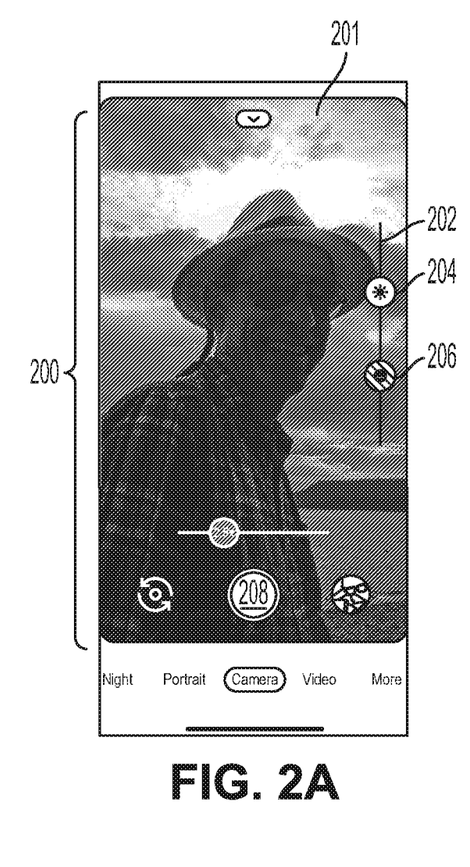
FIGS. 2A to 2C show an example of a single-slider live-view interface for shadow and highlight control.
Figure 2B:
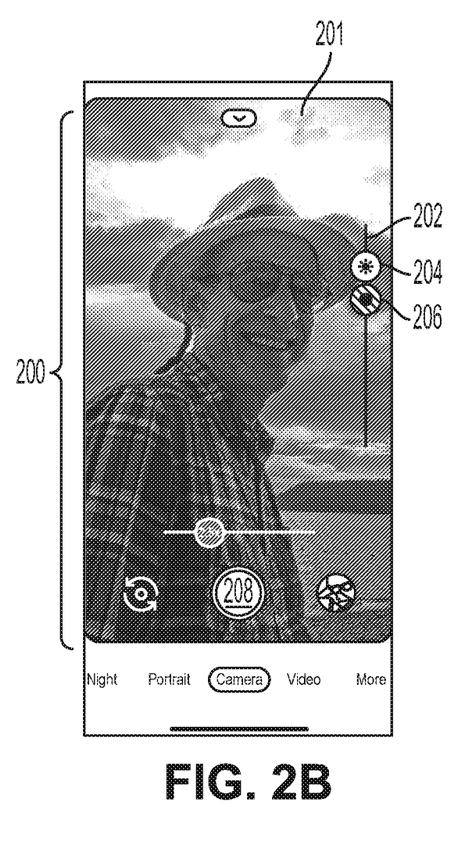
Figure 2C:
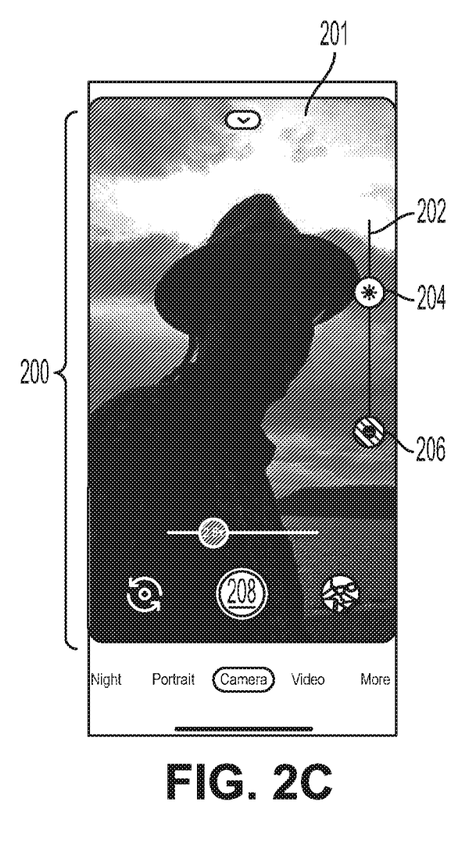

FIGS. 2A to 2C show an example of single-slider live-view interface 200 for shadow and highlight control. Importantly, live-view interface 200 can provide for real-time pre-image-capture control and visualization of a shadow exposure level and a highlight exposure level, independently from one another, in a live-view preview image 201. The live-view interface 200 includes a slider 202 with a first control feature 204 and a second control feature 206. In most scenarios, the first control feature 204 and the second control feature 206 are independently moveable on the slider 202, and control highlight and shadow levels, respectively. (For ease of explanation, the first and second control features may also be referred to as the highlight control and the shadow control, respectively. However, it is contemplated that the illustrated configuration may be applied for other types of pre-image-capture adjustments.)

In FIGS. 2A to 2C, the live-view interface 200 shows changes to a live-view preview image 201 over time. Moving the highlight and/or shadow control on slider 202 will show the resulting adjustments to the camera's exposure settings in real-time, in the live-view preview image. Further, in each FIG. 2A to 2C, the live-view preview image 201 is indicative of the image or video that will be captured if the user taps the image-capture button 208 at that time. Since live-view preview image 201 shows an accurate preview of the exposure settings that will be used for image capture, live-view interface 200 may be referred to as a what-you-see-is-what-you-get (WSYIWYG) viewfinder for a camera device.

In FIG. 2A, the shadow and highlight controls are positioned at approximately ⅓ and ⅔ the height of the slider 202. In some implementations, this particular arrangement may be a default arrangement, which is mapped to auto-exposure settings. Such auto-exposure settings can be determined by a real-time image-processing pipeline for the camera device (and reflected in the live-view preview image shown in FIG. 2A).

For instance, an auto-exposure process may determine a first exposure setting, which controls the exposure settings for image capture, absent further input from the user. In an example embodiment, the first exposure setting may indicate a total exposure time (TET) for the entire image frame (e.g., a global exposure, if no other adjustments are made by the user). This exposure time can be implemented by setting the amount of analog gain (e.g., sensitivity of the image sensor), and digital gain (e.g., gain applied to image data that has been generated by the image sensor). In implementations, the TET used to capture an image (e.g., a "capture TET") may also be used as the exposure level for the highlights areas in an image, and thus may also be referred to as the "highlight TET." (In practice, the shadow TET will usually higher than the capture TET or highlight TET, so that details of the shadows are more visible.) A longer TET can be determined for shadow areas, which can be implemented by applying additional gain to the TET for highlights. As such, the highlight TET may also be characterized as the "short" TET, and the shadow TET may be characterized as the "long" TET.

Referring again to image-capture interface 200, this interface may also allow the user to adjust the exposure for shadow areas separately from highlight areas, before image capture. As such, the first exposure setting can effectively provide a mechanism for adjusting the exposure of image highlights, without adjusting the exposure level of shadow areas. As such, the first control feature 204 may allow for control of highlight exposure level, separately from a shadow exposure level. Correspondingly, the second exposure setting may indicate a second TET for shadows (e.g., a local exposure setting). As such, the second control feature 206 may allow for adjustment of a second TET, which is implemented by applying additional gain (e.g., digital gain) to shadow areas in the image frame. Thus, in most scenarios, adjusting the second TET will effectively adjust the exposure of shadows in the live-view preview image (and an image that is captured via shutter button 208), with little to no effect on the exposure of highlights in the same image.

In some cases, separate control of shadow and highlight levels may be accomplished by providing control over short and long exposure times (e.g., short TET and long TET). In a straightforward implementation, short TET may be applied in highlight areas, and the long TET may be applied in shadow areas. In other implementations, the long/shadow TET could in fact be a grid or matrix of gain values (or TET values), which specifies gain on a pixel-by-pixel basis, or on a tile-by-tile basis (where pixels or grouped into tiles in the image frame). In such implementations, the shadow TET could be determined using a pyramid-based multiple-exposure technique or an approximation technique that utilizes machine learning (e.g., a convolutional neural network) such as Google's HDRNet. Such techniques can help to preserve small edge magnitudes (detail) throughout an image, which can be lost due to compression of highlight areas when a simple global tone-mapping is used to apply gain to darker pixels.

Other processes for adjusting shadow exposure levels separately from highlights are possible. For example, a camera device may be operable to rapidly capture multiple images of a scene using different exposure settings (e.g., in a manner that is typical for HDR imaging on mobile phone cameras). When this methodology is combined with an illustrative image-capture interface, such as that shown in FIGS. 2A to 2C, the interface may provide for separate control of short and long exposure times used for the sequence of images. Further, with this configuration, the live-view preview image 201 may be constructed using data from long exposure image(s) for shadow areas and short exposure image(s) for highlights (or perhaps for any pixels not classified as being in a shadow area).

As another example, a camera could include a stacked image sensor, such as a zig-zag sensor. Such a stacked sensor may have long and short exposure lines diagonally interlaced across the sensor's pixel array (e.g., in a zig-zag pattern), where the pixels in the "zig" lines capture a short exposure, and the pixels in "zag" lines concurrently provide a longer exposure. A zig-zag sensor could also be implemented without a stacked image sensor, so long as it varies the exposure time for different pixels on the sensor. When an illustrative image-capture interface, such as that shown in FIGS. 2A to 2C, is paired with a stacked sensor or zig-zag sensor, the interface may provide for separate control of the short and long exposure. Further, with this configuration, the live-view preview image 201 may be constructed using data from long exposure pixels for shadow areas and short exposure pixels for highlights (or perhaps for any pixels not classified as being in a shadow area).

In some cases, the interface may effectively provide for separate pre-image-capture control of highlight and shadow exposure levels by allowing for separate control of a global exposure and range compression (e.g., brightness and contrast, respectively). For example, the first control feature may allow for adjustment of contrast, while the second control feature may allow for adjustment of contrast. In such implementations, movement of the first control feature up or down the slider may cause adjustments of the long TET and/or short TET to reduce or increase the difference between the long or short TET, thereby decreasing or increasing the contrast, respectively. And, movement of the second control feature on the slider may adjust both long and short TET in the same direction; e.g., by increasing or decreasing both long and short TET, to increase or decrease the overall brightness of the image or sequence of images displayed in a live-view interface.

Returning to the functionality of the live-view interface 200, when the user moves the shadow control 206 upwards on slider 202, the brightness of the shadows increases, and vice versa. For instance, in FIG. 2B, the user has moved the shadow control 206 upwards, as compared to the position of the shadow control 206 in FIG. 2A. As a result, the subject's face and body brighter in the live-view preview image shown in FIG. 2B, as compared to the live-view preview image shown in FIG. 2A. Further, since the amount of upward movement of highlight control 204 from FIG. 2A to 2B is relatively small in comparison to the upward movement of shadow control 206 from FIG. 2A to 2B, there is a much smaller change in the exposure of the highlight areas of the live-view preview image 201 between FIGS. 2A and 2B, as compared to the change in brightness of the shadow areas (e.g., the subject's face and body) between FIGS. 2A and 2B.

Similarly, when the user moves the shadow control 206 downwards on slider 202, this will decrease the brightness of the shadows. For example, in FIG. 2C, the user has moved the shadow control 206 downwards, as compared to the position of the shadow control 204 in both FIGS. 2A and 2B. As a result, the subject's face and body is darker in the live-view preview image shown in FIG. 2C, as compared to the live-view preview image shown in FIGS. 2A and 2B. Further, since the amount of downward movement of shadow control 206 from FIG. 2B to 2C is greater than the amount of downward movement of highlight control 204 from FIG. 2B to 2C, there is a smaller decrease in the exposure of the highlight areas of the live-view preview image 201 from FIG. 2B to 2C, as compared to the larger decrease in the brightness of the shadow areas (e.g., the subject's face and body) from FIG. 2B to 2C.

In a further aspect, to maintain a certain image quality, the movement of the first control feature 204 and the second control feature 206 on slider 202 may be partially dependent on one another. In particular, there may be a certain amount of range compression in an image that is deemed acceptable, possible, and/or practical. As such, the first control feature 204 and the second control feature 206 may be moved independently from one another on slider 202, so long as they do not change the highlight exposure and/or the shadow exposure in a manner that causes the range compression in the live-view preview image 200 to exceed a threshold.

More specifically, the amount of range compression in an image may be characterized numerically by a "relative shadow gain," which is a comparative measure of the shadow exposure (e.g., long TET) and the highlight (e.g., short TET). For instance, the relative shadow gain may be calculated as the ratio of long TET (accounting for the analog exposure plus digital gain applied to shadow areas) to the short TET (accounting for analog exposure plus any digital gain applied to highlight areas); or in other words, the long TET divided by the short TET. Accordingly, a maximum value may be defined for the relative shadow gain, which corresponds to an amount of range compression that is deemed unacceptable. The maximum relative shadow gain may be set such that range compression does not boost the shadows to the point where an unacceptable amount of detail is lost and/or where unacceptable noise is introduced. Additionally, a minimum relative shadow gain may be set such that range compression does not boost the shadows underexpose or "crush" shadows to the point where an unacceptable amount of detail is lost.

To keep the amount of range compression at an acceptable level, there may be certain instances where the computing device will automatically make an adjustment to the highlight exposure level to compensate for user-specified adjustment to the shadow exposure level, and vice versa. In particular, the difference between the highlight exposure level (linked to the highlight control 204) and the shadow exposure level (linked to the shadow control 206) may be visually represented in interface 200 by the distance between the shadow control 206 and the highlight control 204 on slider 202. As such, the distance between the shadow control 206 and the highlight control 204 may also indicate the relative shadow gain. More specifically, when the shadow control 206 and the highlight control 204 are moved closer together on slider 202, this increases the exposure of the shadows (and decreases the exposure of highlights), and thus the amount of digital gain applied to the shadows, as compared to the highlights. As a result, the range compression of the live-view preview image (and a subsequently captured image) increases as the shadow control 206 and the highlight control 204 are moved closer together on slider 202, and vice versa.

In scenarios where a maximum relative shadow gain is specified, a camera application may automatically move the shadow control 206 and/or the highlight control 204 such that they are further apart, in order to keep the relative shadow gain (e.g., shadow TET divided by highlight TET) of the live-view preview image 201 under the maximum relative shadow gain.

For instance, consider FIG. 2B, where the highlight control 204 is higher on slider 202 than it is in FIG. 2A. While it is possible for the user to manually move the highlight control 204 to the position shown in FIG. 2B, the highlight control 204 could also have been moved upward automatically by the camera application, in response to the user moving the shadow control 206 upwards from its position in FIG. 2A to its position in FIG. 2B. Specifically, in FIG. 2B, the distance between the highlight control 204 and the shadow control 206 on the slider 202 may be a minimum separation distance, which corresponds to a maximum amount of range compression that is permissible (e.g., the maximum relative shadow gain).

Conversely, some implementations of image-capture interface 200 may be configured to maintain a minimum relative shadow gain. For example, the minimum relative shadow gain may be defined such that it corresponds to no range compression (e.g., where the shadow TET to highlight TET ratio is equal to 1.0). As such, the minimum relative shadow gain may limit that distance between the highlight control 204 and the shadow control 206, such that the relative shadow gain does not drop below the minimum level. As a result, a camera application may automatically move the shadow control 206 and/or the highlight control 204 such that they are closer together, in order to keep the relative shadow gain of the live-view preview image 201 at or above the minimum relative shadow gain.

With respect to the underlying image processing, when the user increases the shadow level to an extent that causes the relative shadow gain to exceed a maximum threshold, the application may set the short TET equal to the long TET divided by the maximum relative shadow gain. This implementation helps protect against an undesirable amount of range compression, while still adjusting the shadow brightness to the extent specified by user input. Alternatively, when the shadow gain exceeds a maximum threshold, the application could preserve highlights by not boosting shadows as much as specified by the user input (or limiting the amount of brightness increase for shadow areas). To do so, the application could set the long TET equal to the product of the short TET and the maximum relative shadow gain, when the shadow gain exceeds a maximum threshold.

In a further aspect, the first control feature 204 and the second control feature 206 could maintain image quality, without movement of first control feature 204 and the second control feature 206 be partially dependent on one another. For example, movement of the control features may be mapped to control of short TET and/or long TET in a non-linear manner such there is no arrangement of the control features where the relative shadow gain is outside an acceptable range. As another example, the application may specify "dead zones" on the slider, where the user can move the slider, but doing so has no effect. Other examples are also possible.

In other implementations of a live-view camera interface, two separate slider features may be provided, which allow for separate controls of highlight exposure and shadow exposure. Each slider may include a single control feature. Collectively, the two sliders may provide for similar functionality as described in the single-slider arrangement.

Figure 3A:
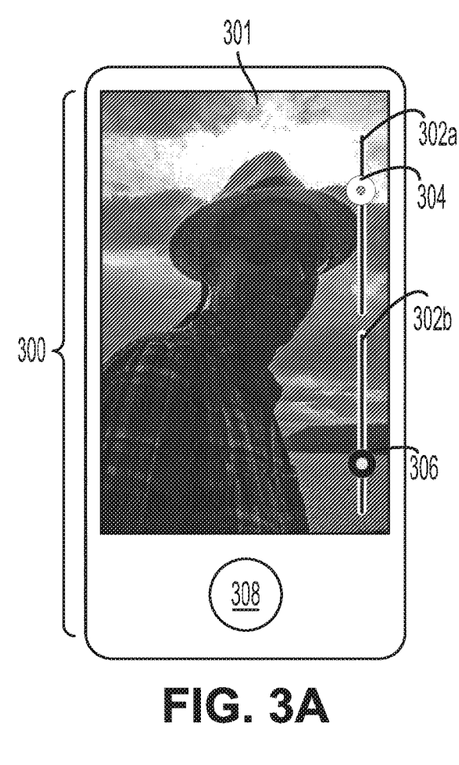
FIGS. 3A to 3C show another example of a single-slider live-view interface for shadow and highlight control.
Figure 3B:
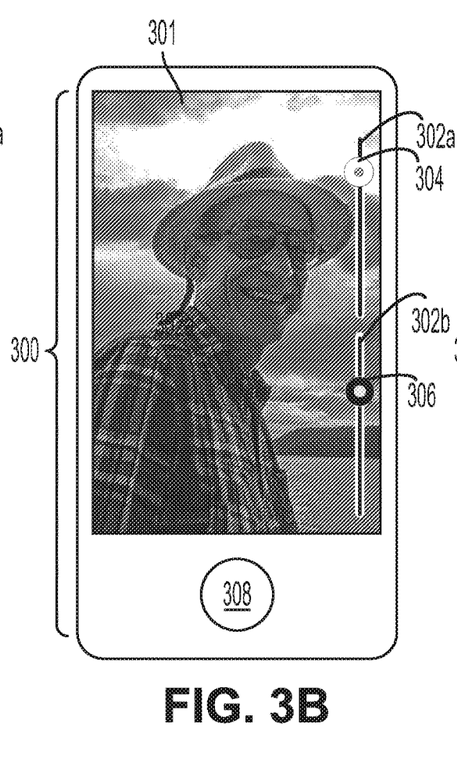
Figure 3C:
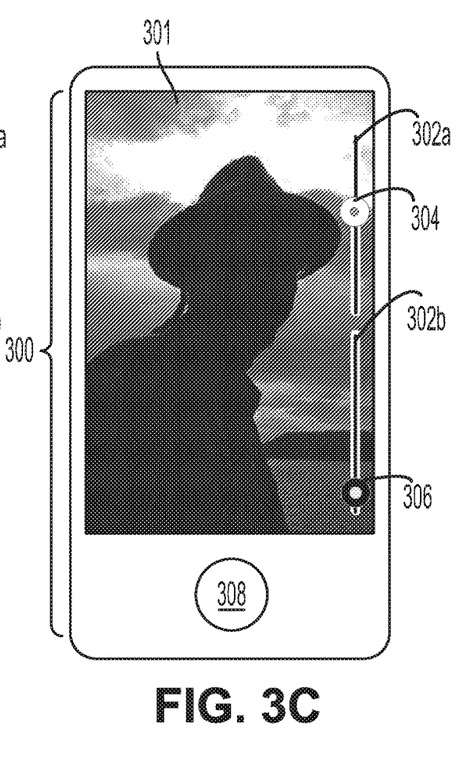

FIGS. 3A to 3C show an example of live-view interface 300 with separate controls for shadow and highlight control. The live-view interface 300 includes a first slider 302a with a first control feature 304 and a second slider 302b with a second control feature 306. The first control feature 304 and the second control feature 306 may provide for control of a highlight exposure setting (e.g., short TET) and a shadow exposure setting (e.g., long TET) of a live-view preview image 301. In most scenarios, the first control feature 304 and the second control feature 306 are independently moveable on their respective sliders 302a and 302b, such that interface 300 allows for separate control of highlight and shadow exposure settings. More generally, the first control feature 304 and the second control feature 306 may function in the same or a similar manner as described above in reference to control features 204 and 206, except that first and second control features 304 and 306 are arranged on separate sliders.

Further, the vertical distance between the first and second control features 304 and 306 corresponds to the relative shadow gain of live-view preview image 301, in the same way that the distance between first and control features 204 and 206 on slider 202 corresponds to the relative shadow gain of live-view preview image 201. Accordingly, in some implementations, an image-capture application may be operable to: (i) automatically move the shadow control 306 and/or the highlight control 304 such that they are further apart vertically, in order to keep the relative shadow gain (e.g., shadow TET divided by highlight TET) of the live-view preview image 301 under a maximum relative shadow gain, and/or (ii) automatically move the shadow control 306 and/or the highlight control 304 such that they are vertically closer, in order to keep the relative shadow gain of the live-view preview image 301 at or above a minimum relative shadow gain.

Other types of interface features may also provide for separate real-time adjustments to shadow and highlight exposure levels, without departing from the scope of the invention. For a single knob interface could be provided, with inner and outer rotatable elements that rotate about the same center point, and allow for separate control of highlight and shadow exposure levels. Alternatively, two separate knobs could provide for separate control of highlight and shadow exposure levels. As another example, multiple moveable control elements (e.g., dots) may be provided in a single X-Y pad control element, which allow for separate control of highlight and shadow exposure levels. Other examples are also possible.

In a further aspect, a live-view interface could implement control features described herein for other pairs of related image-processing functions, in addition or in the alternative to highlight and shadow exposure levels. For instance, the first and second control features disclosed herein could additionally or alternatively provide for real-time pre-image-capture control of black level and white level, and global exposure and contrast, among other possible pairs.

In another aspect, a live-view interface could provide a mechanism for a user to specify control points in a live-view preview image. A control point is a specific location in an image that specifies where a localized effect or processing is applied. Typically, the effect is applied in a localized area surrounding the control point, and the effect is gradually reduced to blend the affected area of the image with surrounding areas. In such embodiments, the control features described herein may be utilized to provide, e.g., separate highlight and shadow exposure controls for a specific control point or group of control points.

As noted above, the two control features of example interfaces may change a live-view preview by separately changing short TET and long TET for the live-view preview (perhaps with exceptions due to limits on relative shadow gain, as described above). Referring back to FIGS. 2A to 2C, moving control feature 204 up the slider would generally increase the short TET for the live-view preview, and vice versa. Similarly, moving control feature 206 up the slider would generally increase the long TET for the live-view preview, and vice versa.

The two control features could also be mapped to other types of image adjustments, and/or could control short and/or long TET in different ways. For example, the first and second control features (such as those shown in FIGS. 2A to 3C), could provide for separate control of (a) brightness or exposure value compensation (EVC), and (b) relative shadow gain. This could be accomplished by mapping a first control feature (e.g., control feature 204 or control feature 304) to both short TET and long TET (so it affects the brightness of the entire live-view preview), and mapping the second control feature (e.g., control feature 206 or control feature 306) to long TET only. In this case, moving control feature 204 up the slider would generally increase the brightness or EVC for the live-view preview (by increasing both short and long TET), and vice versa. And, moving control feature 206 up the slider would change the synthetic exposure for the shadow areas only, by increasing the long TET for the live-view preview, and vice versa. In such implementations, it is also possible that the image-capture application could automatically adjust one or both control features to keep the relative shadow gain below a threshold value, in a similar manner as described above.

As another example, the first and second control features (such as those shown in FIGS. 2A to 3C), could provide for separate control of (a) brightness or EVC, and (b) contrast. This could be accomplished by mapping a first control feature (e.g., control feature 204 or control feature 304) to both short TET and long TET (so it affects the brightness of the entire live-view preview), and mapping the second control feature (e.g., control feature 206 or control feature 306) to adjust the short TET and long TET in opposite directions.

Both knobs affect both TETs. Brightness moves them in the same direction; contrast moves them in opposite directions. We decided not to pursue this one because users usually want to adjust the shadow levels in isolation. In this case, moving control feature 204 up the slider would generally increase the brightness or EVC for the live-view preview (by increasing both short and long TET), and vice versa. And, moving control feature 206 up the slider would adjust the contrast in the live-view preview by concurrently increasing the short TET and decreasing the long TET, and vice versa for downward movement. In such implementations, it is also possible that the image-capture application could automatically adjust one or both control features to keep the relative shadow gain below a threshold value, in a similar manner as described above.

Other mappings of control features to different types of image adjustment processes are also possible. Further, note that the effect of upward/downward movement of the control features could be inverted in such embodiments, and in any other embodiment described herein, without departing from the scope of the invention.

III. Real-Time Adjustment of a Live-View Preview Image

As noted above, a live-view preview image may be a video feed generated by processing data from an image sensor in real-time. This may be accomplished in various ways. In some cases, initial settings for the live-view preview image, such as exposure levels (e.g., short TET and/or long TET) may be determined by applying a trained neural network (e.g., a convolutional neural network or "CNN") to frames from the image sensor.

In such embodiments, a CNN may provide a grid that serves as image processing operator for local tonemapping. This local tonemapping grid may indicate different gain levels for different areas in the image frame. In such case, the control features for adjusting shadow and/or highlight levels may be used to adjust the value of coefficients applied to gain at various points in the grid, and the adjusted tone-mapping grid may be applied to generate the live-view preview image.

Alternatively, an imaging application may use data from an image sensor to generate two low-resolution synthetic exposures for short TET and long TET. A trained CNN could then be applied to these synthetic exposures, to blend portions from both and output a tone-mapping grid that exposes shadow areas and highlight areas differently to output a live-view preview image. In this case, the control features for adjusting shadow and/or highlight levels may be used to adjust the manner in which these two low-resolution synthetic exposures are blended, such that the live-view preview image is updated with the adjustments in real time.

Figure 4A:
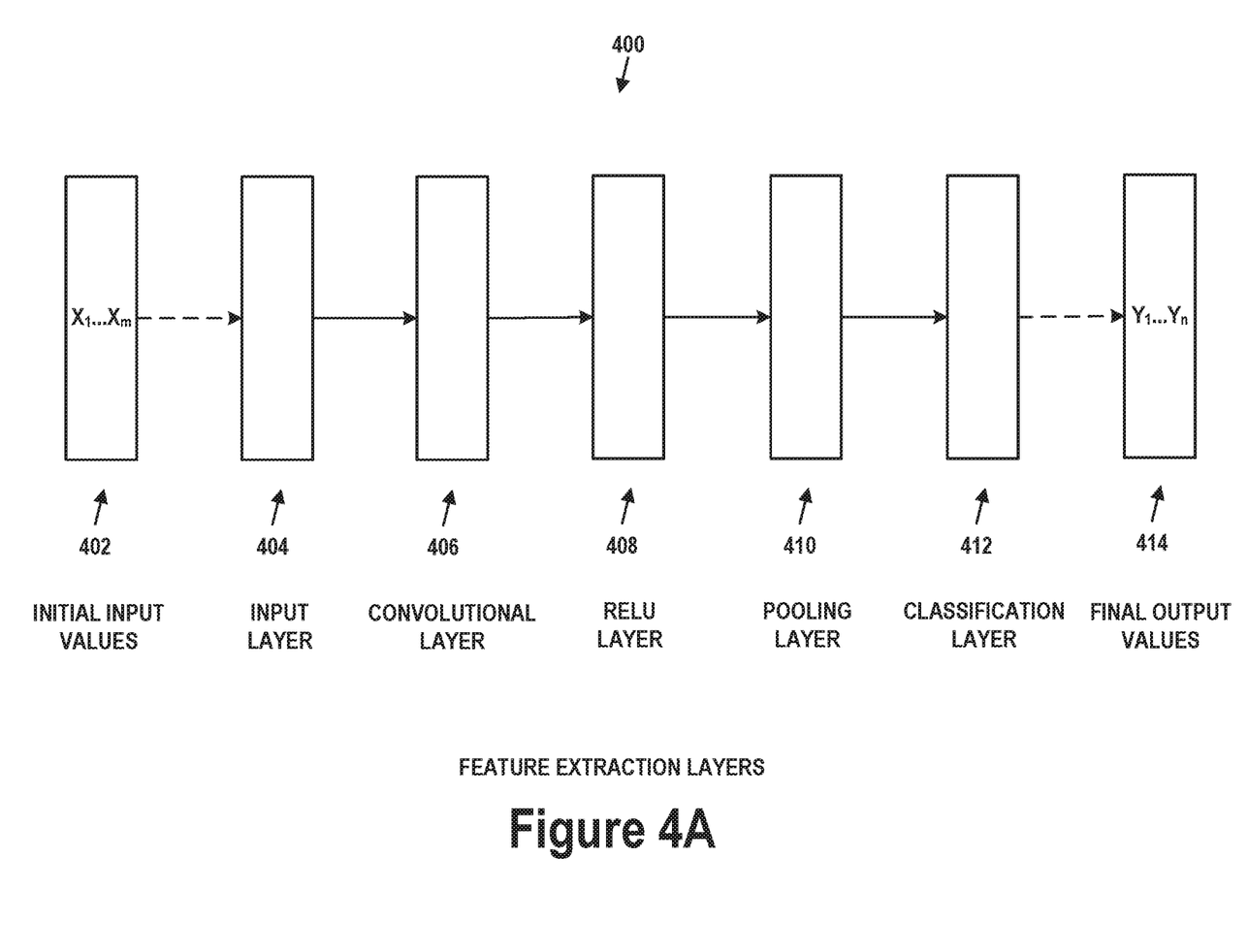
FIG. 4A depicts a convolution neural network (CNN) architecture, in accordance with example embodiments.

FIG. 4A shows a CNN 400, according to examples. CNNs are designed to take advantage of the inherent structure that is found in most images. In particular, nodes in a CNN are only connected to a small number of nodes in the previous layer. This CNN architecture can be thought of as three dimensional, with nodes arranged in a block with a width, a height, and a depth. For example, the aforementioned 32×32 patch of pixels with 3 color channels may be arranged into an input layer with a width of 32 nodes, a height of 32 nodes, and a depth of 3 nodes.

More specifically, in CNN 400, initial input values 402, represented as pixels $X_1 \ldots X_m$, are provided to input layer 404. As discussed above, input layer 404 may have three dimensions based on the width, height, and number of color channels of pixels $X_1 \ldots X_m$. Input layer 404 provides values into one or more sets of feature extraction layers, each set containing an instance of convolutional layer 406, a rectified linear unit function (RELU) layer 408, and a pooling layer 410. The output of pooling layer 410 is provided to one or more classification layers 412. Final output values 414 may be arranged in a feature vector representing a concise characterization of initial input values 402.

Convolutional layer 406 may transform its input values by sliding one or more filters around the three-dimensional spatial arrangement of these input values. A filter is represented by biases applied to the nodes and the weights of the connections therebetween, and generally has a width and height less than that of the input values. The result for each filter may be a two-dimensional block of output values (referred to as an feature map or grid) in which the width and height can have the same size as those of the input values, or one or more of these dimensions may have different size. The combination of each filter's output results in layers of feature maps in the depth dimension, in which each layer represents the output of one of the filters. Such a feature map or grid may provide a local tone-mapping for an output image.

Figure 4B:
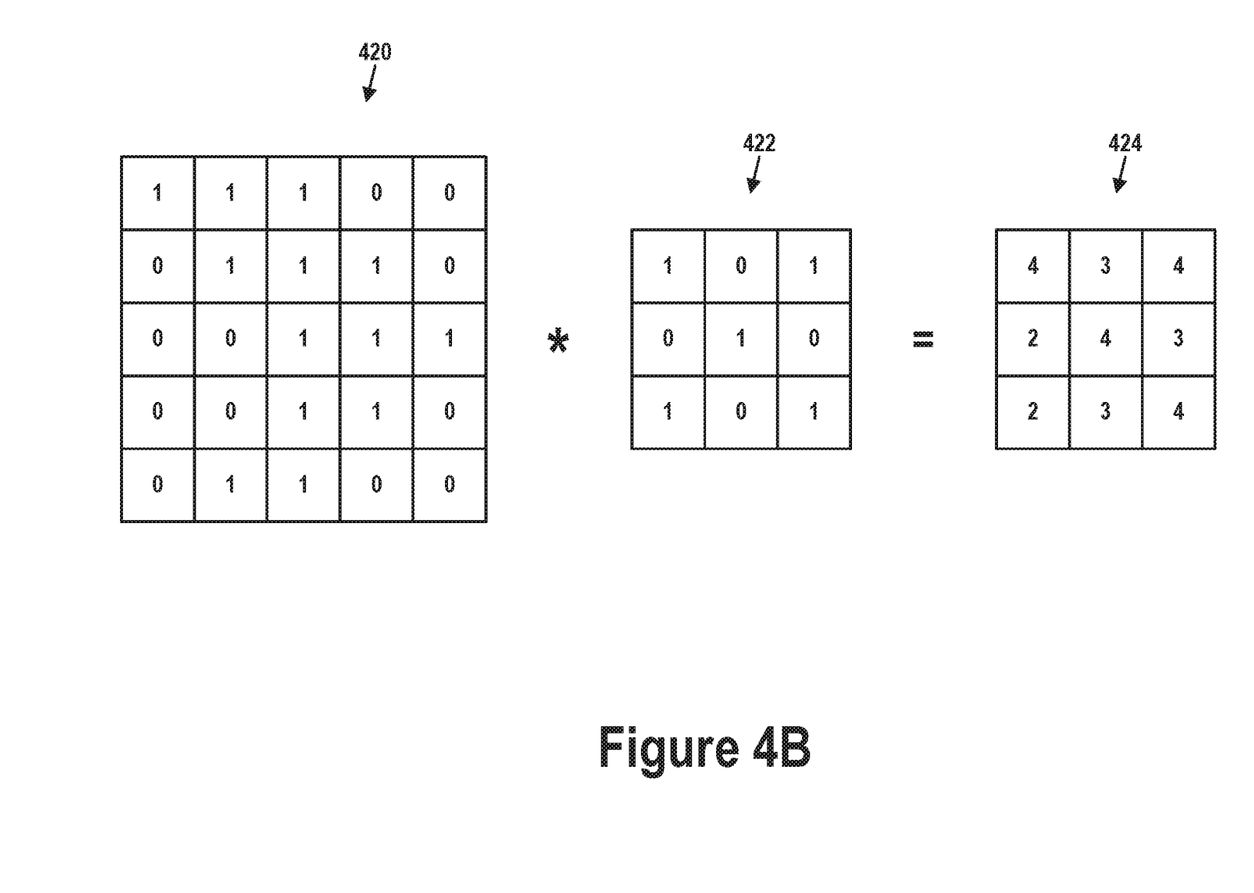
FIG. 4B depicts a convolution, in accordance with example embodiments.

Applying the filter may involve calculating the dot-product sum between the entries in the filter and a two-dimensional depth slice of the input values. An example of this is shown in FIG. 4B. Matrix 420 represents input to a convolutional layer, and thus could be image data, for example. The convolution operation overlays filter 422 on matrix 420 to determine output 424. For instance, when filter 422 is positioned in the top left corner of matrix 420, and the dot-product sum for each entry is calculated, the result is 4. This is placed in the top left corner of output 424.

Turning back to FIG. 4A, a CNN learns filters during training such that these filters can eventually identify certain types of features at particular locations in the input values. As an example, convolutional layer 406 may include a filter that is eventually capable of detecting edges and/or colors in the image patch from which initial input values 402 were derived. A hyperparameter called receptive field determines the number of connections between each node in convolutional layer 406 and input layer 404. This allows each node to focus on a subset of the input values.

ELU layer 408 applies an activation function to output provided by convolutional layer 406. In The RELU function can be a simple thresholding function defined as $f(x)=\max(0, x)$. Thus, the output is 0 when x is negative, and x when x is non-negative. A smoothed, differentiable approximation to the RELU function is the softplus function. It is defined as $f(x)=\log(1+e^x)$. Nonetheless, other functions may be used in this layer.

Pooling layer 410 reduces the spatial size of the data by downsampling each two-dimensional depth slice of output from RELU layer 408. One possible approach is to apply a 2×2 filter with a stride of 2 to each 2×2 block of the depth slices. This will reduce the width and height of each depth slice by a factor of 2, thus reducing the overall size of the data by 75%.

Classification layer 412 computes final output values 414 in the form of a feature vector. As an example, in a CNN trained to be an image classifier, each entry in the feature vector may encode a probability that the image patch contains a particular class of item (e.g., a human face, a cat, a beach, a tree, etc.).

In some embodiments, there are multiple sets of the feature extraction layers. Thus, an instance of pooling layer 410 may provide output to an instance of convolutional layer 406. Further, there may be multiple instances of convolutional layer 406 and RELU layer 408 for each instance of pooling layer 410.

CNN 400 represents a general structure that can be used in image processing. Convolutional layer 406 and classification layer 412 apply weights and biases similarly to layers in ANN 300, and these weights and biases may be updated during backpropagation so that CNN 400 can learn. On the other hand, RELU layer 408 and pooling layer 410 generally apply fixed operations and thus might not learn.

It should be understood that a CNN can include a different number of layers than is shown in the examples herein, and each of these layers may include a different number of nodes. Thus, CNN 400 is merely for illustrative purposes and should not be considered to limit the structure of a CNN.

Further, it should be understood that other methods for generating and updating a live-view preview image are also possible, without departing from the scope of the invention.

IV. Example Computing Devices

Figure 5:
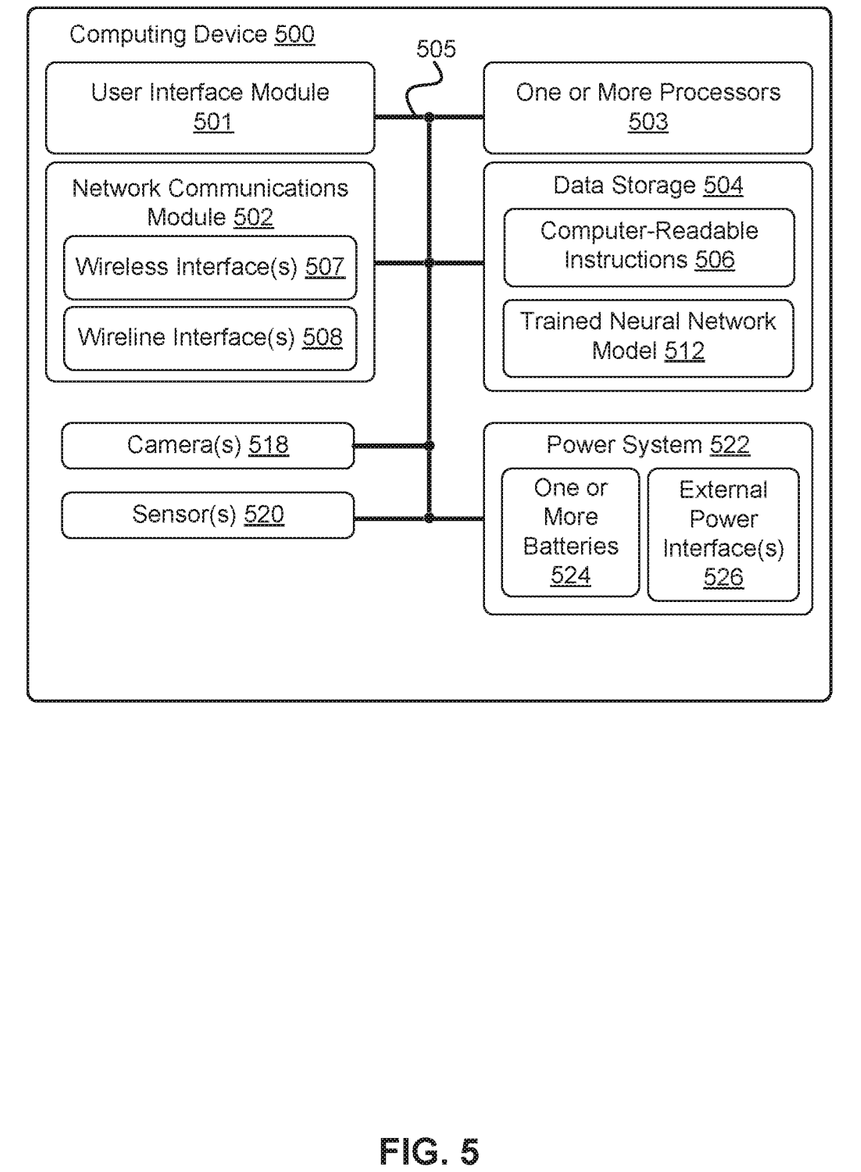
FIG. 5 is a block diagram of an example computing device, in accordance with example embodiments.

FIG. 5 is a block diagram of an example computing device 500, in accordance with example embodiments. In particular, computing device 500 shown in FIG. 5 can be configured to provide the various imaging functions described herein, such as image capture and/or providing a live-view interface (e.g., a viewfinder function). The computing device 500 may take various forms, including, but not limited to, a mobile phone, a standalone camera (e.g., a DSLR, point-and-shoot camera, camcorder, or cinema camera), tablet computer, laptop computer, desktop computer, server system, cloud-based computing device, a wearable computing device, or a network-connected home appliance or consumer electronic device, among other possibilities.

Computing device 500 may include a user interface module 501, a network communications module 502, one or more processors 503, data storage 504, one or more cameras 518, one or more sensors 520, and power system 522, all of which may be linked together via a system bus, network, or other connection mechanism 505.

User interface module 501 can be operable to send data to and/or receive data from external user input/output devices. For example, user interface module 501 can be configured to send and/or receive data to and/or from user input devices such as a touch screen, a computer mouse, a keyboard, a keypad, a touch pad, a track ball, a joystick, a voice recognition module, and/or other similar devices. User interface module 501 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 501 can also be configured to generate audible outputs, with devices such as a speaker, speaker jack, audio output port, audio output device, earphones, and/or other similar devices. User interface module 501 can further be configured with one or more haptic devices that can generate haptic outputs, such as vibrations and/or other outputs detectable by touch and/or physical contact with computing device 500. In some examples, user interface module 501 can be used to provide a graphical user interface (GUI) for utilizing computing device 500.

Network communications module 502 can include one or more devices that provide one or more wireless interfaces 507 and/or one or more wireline interfaces 508 that are configurable to communicate via a network. Wireless interface(s) 507 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interface(s) 508 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 502 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 503 can include one or more general purpose processors, and/or one or more special purpose processors (e.g., digital signal processors, tensor processing units (TPUs), graphics processing units (GPUs), application specific integrated circuits, etc.). One or more processors 503 can be configured to execute computer-readable instructions 506 that are contained in data storage 504 and/or other instructions as described herein.

Data storage 504 can include one or more non-transitory computer-readable storage media that can be read and/or accessed by at least one of one or more processors 503. The one or more computer-readable storage media can include volatile and/or non-volatile storage components, such as optical, magnetic, organic or other memory or disc storage, which can be integrated in whole or in part with at least one of one or more processors 503. In some examples, data storage 504 can be implemented using a single physical device (e.g., one optical, magnetic, organic or other memory or disc storage unit), while in other examples, data storage 504 can be implemented using two or more physical devices.

Data storage 504 can include computer-readable instructions 506 and perhaps additional data. In some examples, data storage 504 can include storage required to perform at least part of the herein-described methods, scenarios, and techniques and/or at least part of the functionality of the herein-described devices and networks. In some examples, data storage 504 can include storage for a trained neural network model 512 (e.g., a model of a trained convolutional neural network such as a convolutional neural network). In particular of these examples, computer-readable instructions 506 can include instructions that, when executed by processor(s) 503, enable computing device 500 to provide for some or all of the functionality of trained neural network model 512.

In some examples, computing device 500 can include one or more cameras 518. Camera(s) 518 can include one or more image capture devices, such as still and/or video cameras, equipped to capture light and record the captured light in one or more images; that is, camera(s) 518 can generate image(s) of captured light. The one or more images can be one or more still images and/or one or more images utilized in video imagery. Camera(s) 518 can capture light and/or electromagnetic radiation emitted as visible light, infrared radiation, ultraviolet light, and/or as one or more other frequencies of light.

In some examples, computing device 500 can include one or more sensors 520. Sensors 520 can be configured to measure conditions within computing device 500 and/or conditions in an environment of computing device 500 and provide data about these conditions. For example, sensors 520 can include one or more of: (i) sensors for obtaining data about computing device 500, such as, but not limited to, a thermometer for measuring a temperature of computing device 500, a battery sensor for measuring power of one or more batteries of power system 522, and/or other sensors measuring conditions of computing device 500; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 500, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 500, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 500, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 520 are possible as well.

Power system 522 can include one or more batteries 524 and/or one or more external power interfaces 526 for providing electrical power to computing device 500. Each battery of the one or more batteries 524 can, when electrically coupled to the computing device 500, act as a source of stored electrical power for computing device 500. One or more batteries 524 of power system 522 can be configured to be portable. Some or all of one or more batteries 524 can be readily removable from computing device 500. In other examples, some or all of one or more batteries 524 can be internal to computing device 500, and so may not be readily removable from computing device 500. Some or all of one or more batteries 524 can be rechargeable. For example, a rechargeable battery can be recharged via a wired connection between the battery and another power supply, such as by one or more power supplies that are external to computing device 500 and connected to computing device 500 via the one or more external power interfaces. In other examples, some or all of one or more batteries 524 can be non-rechargeable batteries.

One or more external power interfaces 526 of power system 522 can include one or more wired-power interfaces, such as a USB cable and/or a power cord, that enable wired electrical power connections to one or more power supplies that are external to computing device 500. One or more external power interfaces 526 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 526, computing device 500 can draw electrical power from the external power source the established electrical power connection. In some examples, power system 522 can include related sensors, such as battery sensors associated with the one or more batteries or other types of electrical power sensors.

V. Cloud-Based Servers

Figure 6:
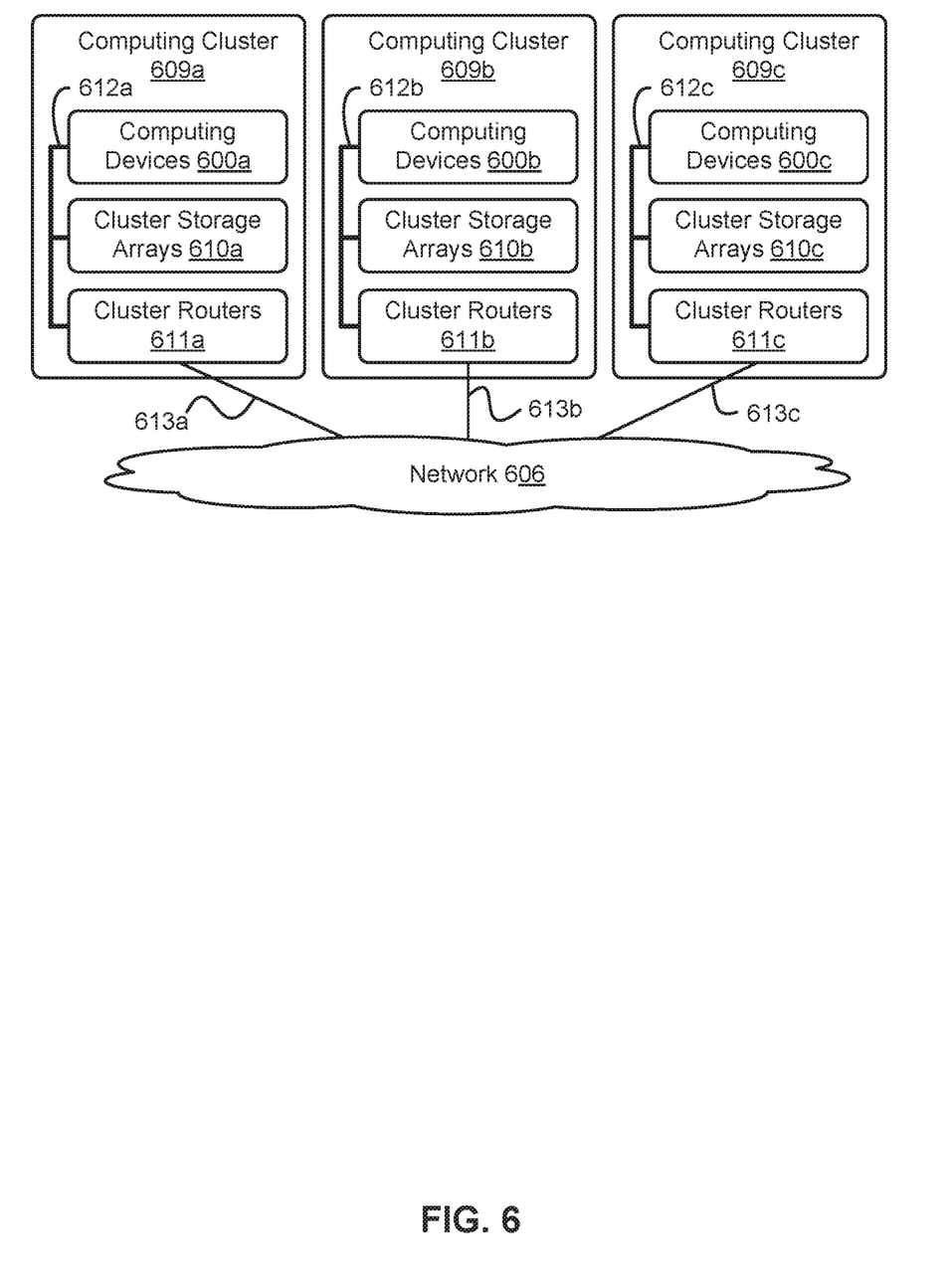
FIG. 6 depicts a network of computing clusters arranged as a cloud-based server system, in accordance with example embodiments.

FIG. 6 depicts a network 606 of computing clusters 609a, 609b, 609c arranged as a cloud-based server system in accordance with an example embodiment. Computing clusters 609a, 609b, 609c can be cloud-based devices that store program logic and/or data of cloud-based applications and/or services; e.g., perform at least one function of and/or related to a convolutional neural network, confidence learning, a predicted target image, a predicted original lighting model, convolutional neural network, confidence learning, and/or method 300.

In some embodiments, computing clusters 609a, 609b, 609c can be a single computing device residing in a single computing center. In other embodiments, computing clusters 609a, 609b, 609c can include multiple computing devices in a single computing center, or even multiple computing devices located in multiple computing centers located in diverse geographic locations. For example, FIG. 6 depicts each of computing clusters 609a, 609b, and 609c residing in different physical locations.

In some embodiments, data and services at computing clusters 609a, 609b, 609c can be encoded as computer readable information stored in non-transitory, tangible computer readable media (or computer readable storage media) and accessible by other computing devices. In some embodiments, computing clusters 609a, 609b, 609c can be stored on a single disk drive or other tangible storage media, or can be implemented on multiple disk drives or other tangible storage media located at one or more diverse geographic locations.

FIG. 6 depicts a cloud-based server system in accordance with an example embodiment. In FIG. 6, functionality of a convolutional neural network, confidence learning, and/or a computing device can be distributed among computing clusters 609a, 609b, 609c. Computing cluster 609a can include one or more computing devices 600a, cluster storage arrays 610a, and cluster routers 611a connected by a local cluster network 612a. Similarly, computing cluster 609b can include one or more computing devices 600b, cluster storage arrays 610b, and cluster routers 611b connected by a local cluster network 612b. Likewise, computing cluster 609c can include one or more computing devices 600c, cluster storage arrays 610c, and cluster routers 611c connected by a local cluster network 612c.

In some embodiments, each of computing clusters 609a, 609b, and 609c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 609a, for example, computing devices 600a can be configured to perform various computing tasks of convolutional neural network, confidence learning, and/or a computing device. In one embodiment, the various functionalities of a convolutional neural network, confidence learning, and/or a computing device can be distributed among one or more of computing devices 600a, 600b, 600c. Computing devices 600b and 600c in respective computing clusters 609b and 609c can be configured similarly to computing devices 600a in computing cluster 609a. On the other hand, in some embodiments, computing devices 600a, 600b, and 600c can be configured to perform different functions.

In some embodiments, computing tasks and stored data associated with a convolutional neural network, confidence learning, and/or a computing device can be distributed across computing devices 600a, 600b, and 600c based at least in part on the processing requirements of a convolutional neural network, confidence learning, and/or a computing device, the processing capabilities of computing devices 600a, 600b, 600c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 610a, 610b, 610c of computing clusters 609a, 609b, 609c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a convolutional neural network, confidence learning, and/or a computing device can be distributed across computing devices 600a, 600b, 600c of computing clusters 609a, 609b, 609c, various active portions and/or backup portions of these components can be distributed across cluster storage arrays 610a, 610b, 610c. For example, some cluster storage arrays can be configured to store one portion of the data of a convolutional neural network, confidence learning, and/or a computing device, while other cluster storage arrays can store other portion(s) of data of a convolutional neural network, confidence learning, and/or a computing device. Additionally, some cluster storage arrays can be configured to store backup versions of data stored in other cluster storage arrays.

Cluster routers 611a, 611b, 611c in computing clusters 609a, 609b, 609c can include networking equipment configured to provide internal and external communications for the computing clusters. For example, cluster routers 611a in computing cluster 609a can include one or more interne switching and routing devices configured to provide (i) local area network communications between computing devices 600a and cluster storage arrays 610a via local cluster network 612a, and (ii) wide area network communications between computing cluster 609a and computing clusters 609b and 609c via wide area network link 613a to network 606. Cluster routers 611b and 611c can include network equipment similar to cluster routers 611a, and cluster routers 611b and 611c can perform similar networking functions for computing clusters 609b and 609b that cluster routers 611a perform for computing cluster 609a.

In some embodiments, the configuration of cluster routers 611a, 611b, 611c can be based at least in part on the data communication requirements of the computing devices and cluster storage arrays, the data communications capabilities of the network equipment in cluster routers 611a, 611b, 611c, the latency and throughput of local cluster networks 612a, 612b, 612c, the latency, throughput, and cost of wide area network links 613a, 613b, 613c, and/or other factors that can contribute to the cost, speed, fault-tolerance, resiliency, efficiency and/or other design criteria of the moderation system architecture.

VII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims

What is claimed is:

1. A method comprising:
displaying, on a display device, a graphic interface for image capture, the graphic interface comprising: (a) a live-view preview image based on an image data stream from an image sensor of an image-capture device, and (b) a first control feature and a second control feature;
receiving, via the graphic interface, first input data corresponding to a first interaction with the first control feature, and responsively adjusting a first exposure setting based on the first interaction;
applying the first exposure setting in real-time to at least one highlight area in the live-view preview image, wherein the first exposure setting comprises an exposure time and a first gain multiplier;
receiving, via the graphic interface, second input data corresponding to a second interaction with the second control feature, and responsively adjusting a second exposure setting based on the second interaction;
applying the second exposure setting in real-time to at least one shadow area in the live-view preview image, wherein the second exposure setting comprises the exposure time and a second gain multiplier, the second gain multiplier being greater than the first gain multiplier; and
subsequently receiving third input data corresponding to an image-capture command, and responsively operating the image-capture device to capture an image in accordance with both the first exposure setting and the second exposure setting.

2. The method of claim 1, wherein the first control feature and the second control feature are displayed are part of a single control feature in the graphic interface.

3. The method of claim 2, wherein the single control feature comprises a slider, and wherein the first control feature and the second control feature are movable along the slider.

4. The method of claim 3, wherein the distance, along the slider, between the first and second interface features, corresponds to range compression of the live-view image data.

5. The method of claim 2, wherein the single control feature comprises a knob interface, wherein the first control feature comprises an inner rotatable element of the knob interface, wherein the second control feature comprises an outer rotatable element of the knob interface, and wherein the inner and rotatable elements both rotate about a center point of the knob interface.

6. The method of claim 2, wherein the single control feature comprises an X-Y pad, wherein the first control feature and the second control feature are moveable within the X-Y pad.

7. The method of claim 1, wherein the first control feature comprises a first slider feature, and the second control feature comprises a second slider.

8. The method of claim 7, wherein the first slider is operable to adjust a highlight exposure setting used by the image-capture system to generate the image data stream, and wherein the second slider is operable to adjust a shadow exposure setting used by the image-capture system to generate the image data stream.

9. The method of claim 1, wherein the first exposure setting comprises a highlight exposure setting used by the image-capture system to generate the image data stream.

10. The method of claim 1, wherein the second exposure setting comprises a shadow exposure setting.

11. The method of claim 10, wherein the shadow exposure setting affects an amount of gain to apply to one or more shadow areas of the image data stream from the image-capture system.

12. The method of claim 1, further comprising:
applying the local exposure setting to the image data stream to generate the live-view image data.

13. The method of claim 1, wherein the live-view image data provides a what-you-see-is-what-you-get (WYSIWYG) viewfinder for the image-capture system.

14. The method of claim 1, wherein the graphic interface further comprises an image-capture feature for causing a image-capture system to capture image data.

15. A computing device, comprising:
one or more processors; and
one or more computer readable media having computer-readable instructions stored thereon that, when executed by the one or more processors, cause the mobile computing device to carry out functions comprising the method of claim 1.

16. An article of manufacture comprising one or more computer readable media having computer-readable instructions stored thereon that, when executed by one or more processors of a computing device, cause the computing device to carry out functions that comprise the method of claim 1.

17. The article of manufacture of claim 16, wherein the one or more computer readable media comprise one or more non-transitory computer readable media.

18. A method comprising:
displaying, on a display device, a graphic interface for image capture, the graphic interface comprising: (a) a live-view preview based on an image data stream from an image sensor of an image-capture device, and (b) a first control feature and a second control feature;
receiving, via the graphic interface, first input data corresponding to a first interaction with the first control feature, and responsively adjusting a first image setting based on the first interaction;
applying the first image setting in real-time to at least one highlight area in the live-view preview, wherein the first image setting comprises an exposure time and a first gain multiplier;
receiving, via the graphic interface, second input data corresponding to a second interaction with the second control feature, and responsively adjusting a second image setting based on the second interaction;
applying the second image setting in real-time to at least one highlight area in the live-view preview image, wherein the second image setting comprises the exposure time and a second gain multiplier, the second gain multiplier being greater than the first gain multiplier; and
subsequently receiving third input data corresponding to an image-capture command, and responsively operating the image-capture device to capture an image in accordance with both the first image setting and the second image setting.

19. The method of claim 18:
wherein applying the first image setting comprises adjusting a short total exposure time for the live-view preview; and
wherein applying the second image setting comprises adjusting a long total exposure time for the live-view preview.

20. The method of claim 18, wherein the first control feature provides for adjustment of highlight areas in the live-view preview, and wherein the second control feature provides for adjustment of shadow areas in the live-view preview.

21. The method of claim 20:
wherein applying the first image setting comprises adjusting a short total exposure time and a long total exposure time for the live-view preview; and
wherein applying the second image setting comprises adjusting the long total exposure time for the live-view preview.

22. The method of claim 18, wherein the first control feature provides for adjustment of brightness for the live-view preview, and wherein the second control feature provides for shadow adjustment in the live-view preview.

23. The method of claim 22:
wherein applying the first image setting comprises adjusting a short total exposure time and a long total exposure time for the live-view preview, wherein the adjustments to the long and short total exposure times are made in the same direction; and
wherein applying the second image setting comprises adjusting the long total exposure time for the live-view preview.

24. The method of claim 22:
wherein applying the first image setting comprises making a first adjustment to a short total exposure time and a first adjustment to a long total exposure time for the live-view preview, wherein the first adjustments to the long and short total exposure times are made in the same direction; and wherein applying the second image setting comprises making a second adjustment to a short total exposure time and a second adjustment to a long total exposure time for the live-view preview, wherein the second adjustments to the long and short total exposure times are made in opposite directions to one another.

25. The method of claim 18, wherein the first control feature provides for adjustment of brightness for the live-view preview, and wherein the second control feature provides for adjustment of contrast in the live-view preview.

\* \* \* \* \*